(12) United States Patent
Ichinose

(10) Patent No.: US 6,819,990 B2
(45) Date of Patent: Nov. 16, 2004

(54) TOUCH PANEL INPUT FOR AUTOMOTIVE DEVICES

(75) Inventor: Toshihiko Ichinose, Farmington, MI (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 120 days.

(21) Appl. No.: 10/329,306

(22) Filed: Dec. 23, 2002

(65) Prior Publication Data

US 2004/0122572 A1 Jun. 24, 2004

(51) Int. Cl.[7] .................................................. G06F 7/00
(52) U.S. Cl. ............................................ 701/36; 701/1
(58) Field of Search ................................ 701/1, 29, 30, 701/31, 35, 36; 345/112, 113, 116, 117, 156, 335, 530, 733, 763, 764, 765; 340/425.5, 436, 459, 500, 521

(56) References Cited

U.S. PATENT DOCUMENTS

| | | | |
|---|---|---|---|
| 5,808,374 A | 9/1998 | Miller et al. | |
| 5,864,105 A | 1/1999 | Andrews | |
| 5,903,229 A | 5/1999 | Kishi | |
| 5,963,890 A | * 10/1999 | Sarbach | ...................... 702/136 |
| 6,157,372 A | 12/2000 | Blackburn et al. | |
| 6,198,992 B1 | * 3/2001 | Winslow | ..................... 701/23 |
| 6,337,678 B1 | 1/2002 | Fish | |
| 6,373,472 B1 | 4/2002 | Palalau et al. | |
| 6,418,362 B1 | 7/2002 | St. Pierre et al. | |
| 6,429,846 B2 | 8/2002 | Rosenberg et al. | |
| 6,434,450 B1 | 8/2002 | Griffin, Jr. et al. | |
| 6,438,465 B2 | 8/2002 | Obradovich et al. | |

* cited by examiner

*Primary Examiner*—Richard M. Camby
(74) *Attorney, Agent, or Firm*—Harness, Dickey & Pierce, PLC

(57) ABSTRACT

An integrated tactile visual interface for device control within a vehicle comprises a touch pad that generates an input signal in response to touch input from a user. The interface further comprises a display having at least one display region and a user focus or cursor. A software component receives the input signal and communicates an output signal to the display, wherein the output signal is indicative of the input signal. The software component generates a feedback signal if the user focus traverses a boundary of the display region on the display. A feedback device is integrated with the touchpad and provides tangible feedback to the user in response to the feedback signal.

18 Claims, 8 Drawing Sheets

TOUCH PANEL INPUT FOR AUTOMOTIVE DEVICES

FIELD OF THE INVENTION

The present invention relates to automotive devices, and more particularly to controlling automotive devices with a touch panel input.

BACKGROUND OF THE INVENTION

Vehicles include multiple devices that may be controlled by input from a user. Examples of such devices include a radio, power windows, a heating and cooling system, and a navigation system. The user interacts with the devices to adjust various functions and operations thereof. For example, the user may adjust the position of the power windows or the volume of the radio.

Moreover, each device may have multiple adjustable features. For instance, the user may adjust radio settings such as volume, audio characteristics, and tuning. Typically, the devices require a separate input mechanism for each adjustable feature. With the increased number of controllable devices available in vehicles, along with the increased complexity of each individual device, the user may be required to operate a multitude of inputs. As a result, the user may encounter significant difficulty while attempting to operate the devices while driving the vehicle.

One method for minimizing input mechanisms is to incorporate a display interface. The user adjusts the devices by interacting with a hierarchical menu shown on the display to select the devices and functions. The user may make selections from the menu with input mechanisms external to the display, such as an interface of buttons or switches. Alternatively, the display may be a touchscreen, requiring the user to interact directly with the display to select menu choices.

SUMMARY OF THE INVENTION

An integrated tactile visual interface controls devices within a vehicle. A touch pad generates an input signal in response to input from a user. A display includes at least one display region and a user focus. A software module receives the input signal and communicates an output signal indicative of the input signal to the display. The display adjusts the display region and the user focus according to the output signal. The software module generates a feedback signal if the user focus traverses a boundary of the display region. A feedback device integrated with the touch pad receives the feedback signal and provides tangible feedback to the user through the touch pad in response to the feedback signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
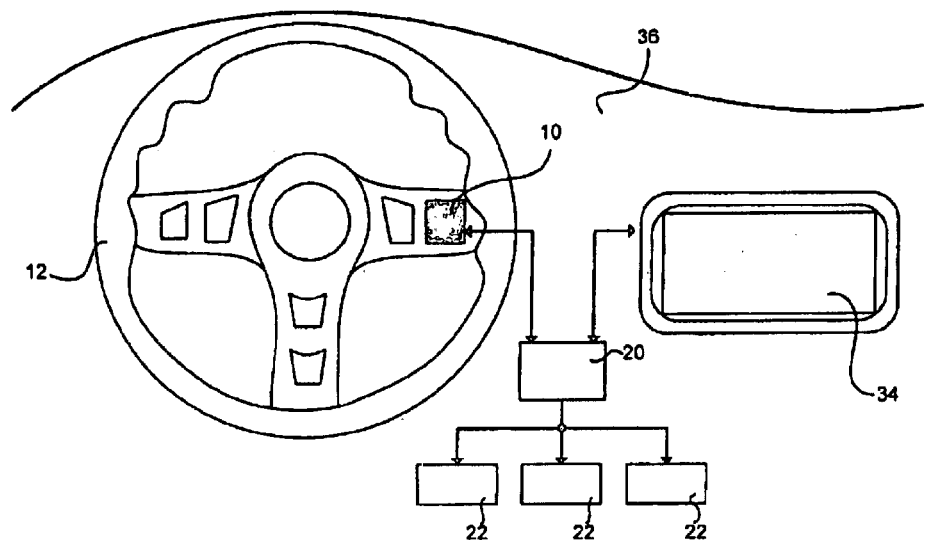
FIG. 1A illustrates a touchpad interface integrated with a vehicle steering wheel according to the present invention.

The following description of the preferred embodiment(s) is merely exemplary in nature and is in no way intended to limit the invention, its application, or uses. For purposes of clarity, the same reference numbers will be used in the drawings to identify similar elements.

Figure 1B:
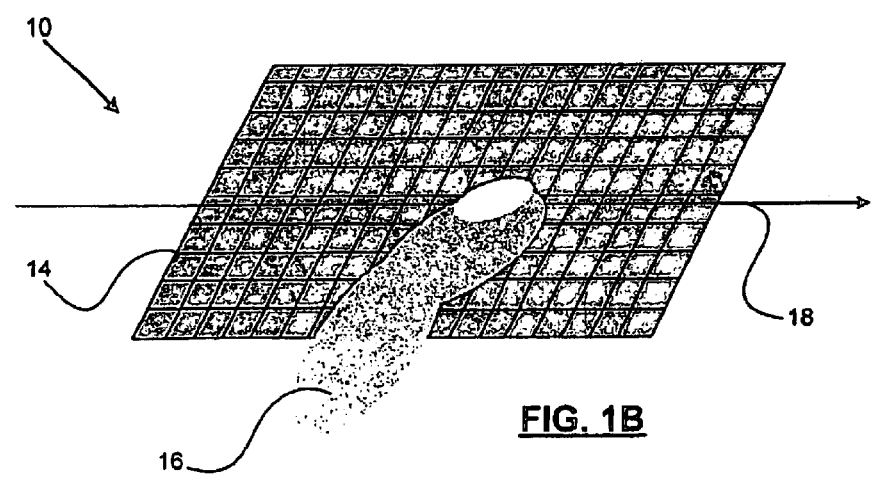
FIG. 1B illustrates an array of discrete touchable areas of a touchpad according to the present invention.

Referring to FIGS. 1A and 1B, a touchpad 10 is mounted on a steering wheel 12 in a vehicle according to the present invention. The touchpad 10 may be mounted elsewhere in the vehicle proximate the user, such as an instrument panel or an armrest. The user interacts with the touchpad 10 by means of touch inputs as is known in the art. The touchpad 10 comprises an array of discrete touchable areas 14 as shown in FIG. 1B. The touchpad 10 generates signals in response to touch patterns on the discrete touchable areas 14. The user may input the touch patterns with a finger 16 or a thumb. For example, the user may slide the finger 16 across the discrete touchable areas 14 in the direction indicated by the arrow 18. The signals generated are indicative of the particular touch pattern input by the user.

The signals are communicated to a software module 20, allowing the user to interact with controllable devices 22 using the touchpad 10. In the preferred embodiment, the interaction between the user and the software module 20 is presented on a display 34. The software module 20 processes the signals from the touchpad 10 and generates commands for the controllable devices 22. The display 34 may be mounted on the dashboard 36 or any suitable location within visual range of the user, such as a center console.

Figure 2A:
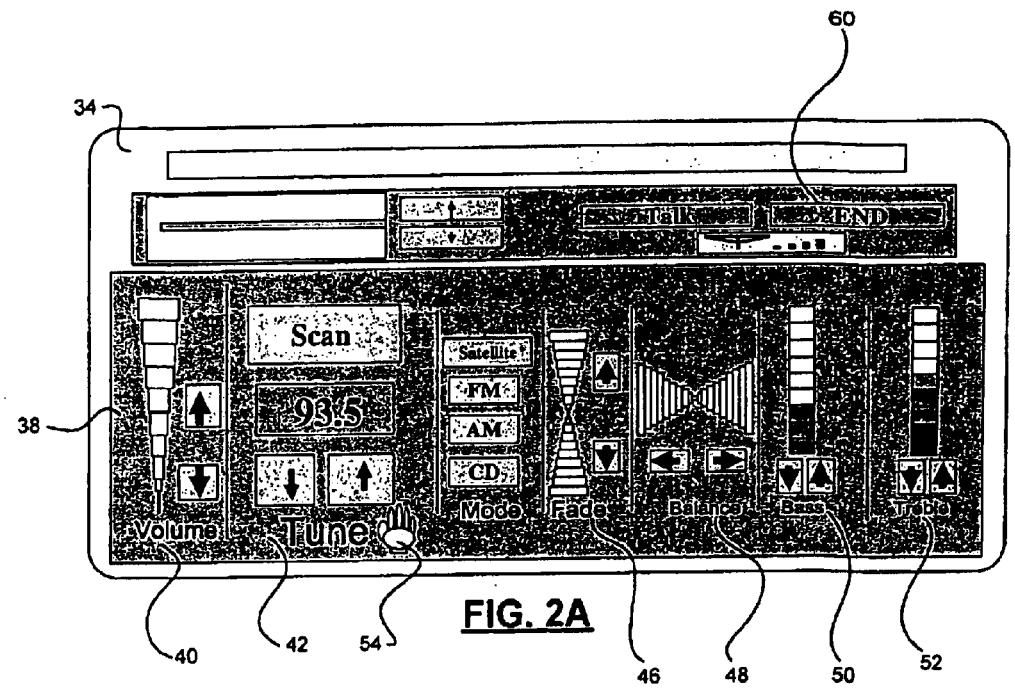
FIGS. 2A and 2B illustrate the selectable functions of an audio device according to the present invention.
Figure 2B:
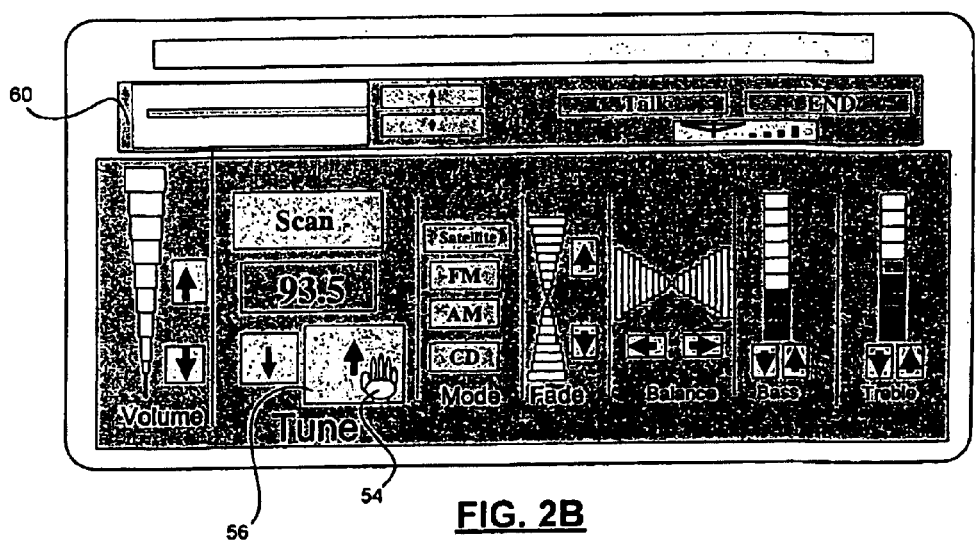

Referring now to FIGS. 2A and 2B, the display 34 presents visual data to the user indicative of touch patterns input at the touchpad 10 (as shown in FIGS. 1A and 1B). The display 34 may present selectable audio functions in a primary window 38 such as volume 40, tuning 42, antenna mode 44, fade 46, balance 48, bass 50, and treble 52. A user focus, such as a cursor 54, is positioned according to the touch patterns input at the touchpad 10. For example, sliding the finger 16 according to the arrow 18 (as shown in FIG. 1B) will cause the cursor 54 move from left to right on the display 34. Alternatively, the user focus may be implemented in another suitable manner as is known in the art. For example, selectable areas or regions of the display 34 may be highlighted or emphasized as the user interacts with the touchpad 10.

When the cursor 54 is positioned over a desired function, the user may select or adjust the function. For example, the user may position the cursor 54 over the tuning functions 42. The user may adjust the tuning 42 by positioning the cursor 54 over a tuning control button 56 and tapping the touchpad 10. As shown in FIG. 1B, the tuning control button 56 is enlarged when the cursor 54 is positioned thereon. This enables the user to have increased control over the position of the cursor 54 in relation to various locations on the display 34. Similarly, the portion of the display 34 containing the tuning functions 42 is enlarged when the cursor 54 is positioned thereon. Because of the increased size of the selectable areas of the display 34 as shown in FIGS. 2A and 2B, the user may more easily control the position of the cursor 54 using the touchpad 10.

Still referring to FIGS. 2A and 2B, the display 34 presents secondary windows 60 to the user in addition to the primary window 38. The user may select the secondary window 60 to gain access to additional device functions. The user may move the cursor 54 over any portion of the secondary window 60 and tap the touchpad 10, causing the display 34 to present the additional device functions in the primary window 38. As shown in FIGS. 2A and 2B, the secondary window 60 provides access to mobile telephone functions.

Figure 3A:
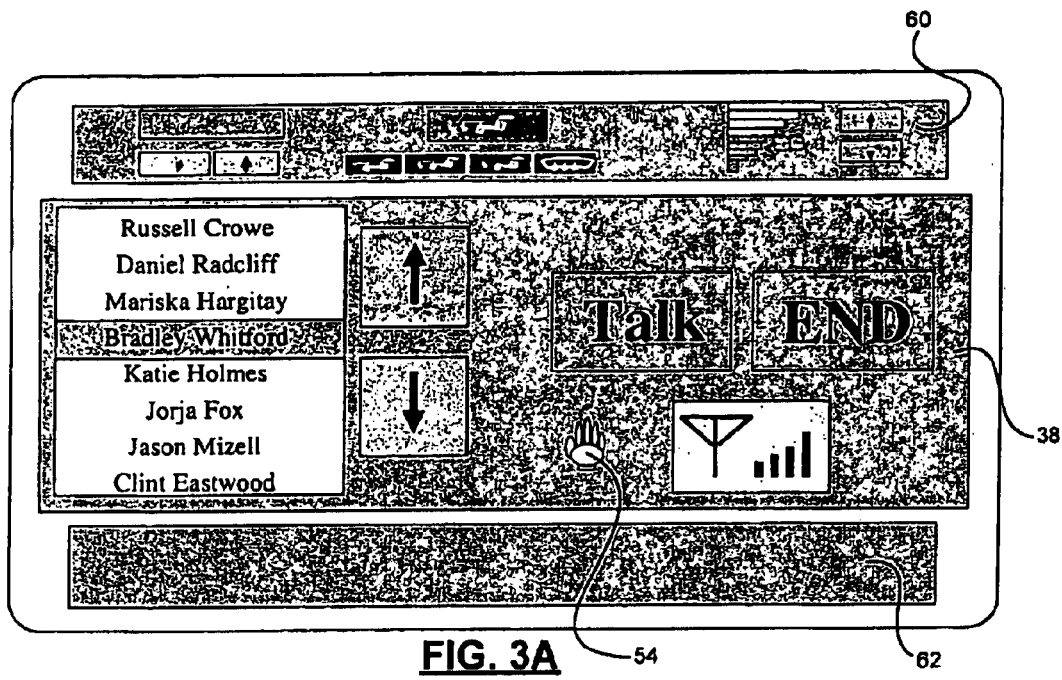
FIGS. 3A and 3B illustrate the selectable functions of a mobile telephone device according to the present invention.
Figure 3B:
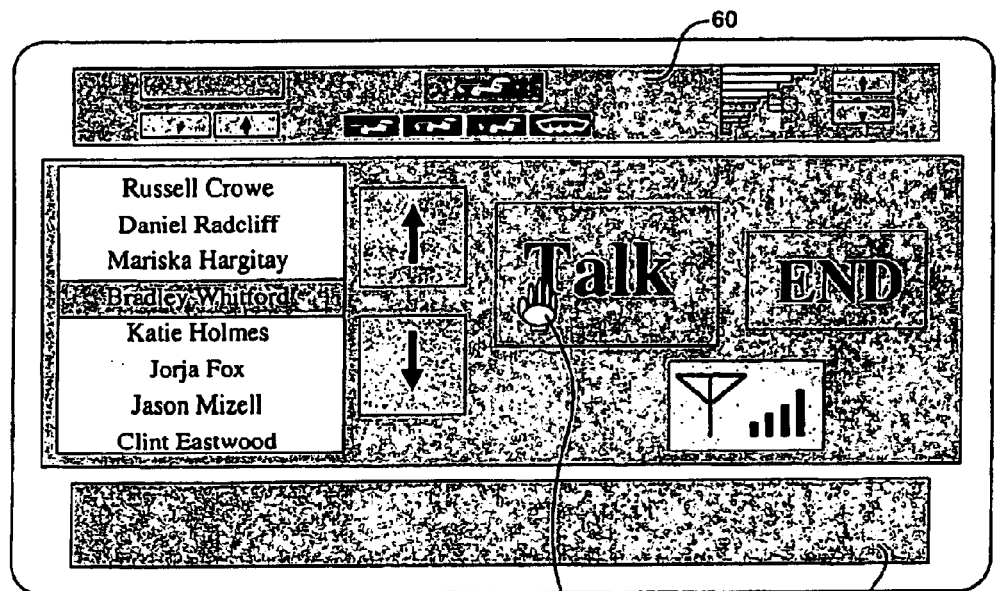

If the user selects the secondary window 60, the display 34 presents selectable mobile telephone functions in the primary window 38 as shown in FIGS. 3A and 3B. The secondary windows 60 now provide additional devices. For example, the secondary window 60 may provide access to HVAC functions. The user may also select secondary window 62 to return to the selectable audio functions. In this manner, the user may interact with the touchpad 10 to navigate through the selectable functions of various devices. The primary window 38 provides the user with all of the selectable functions for a particular device.

Figure 4A:
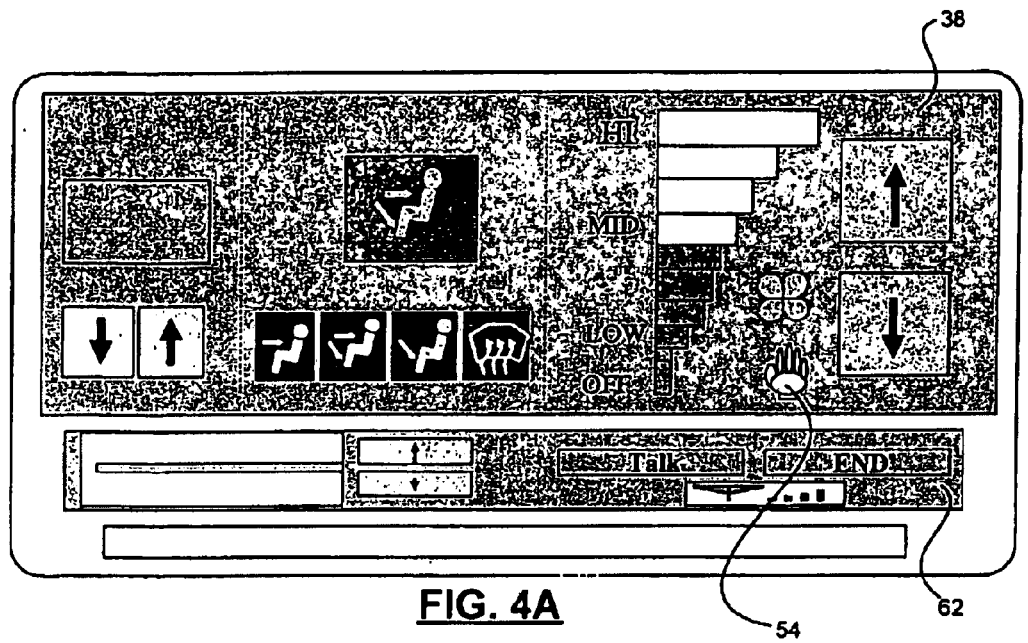
FIGS. 4A, 4B, 5A, and 5B illustrate the selectable functions of an HVAC device according to the present invention.
Figure 4B:
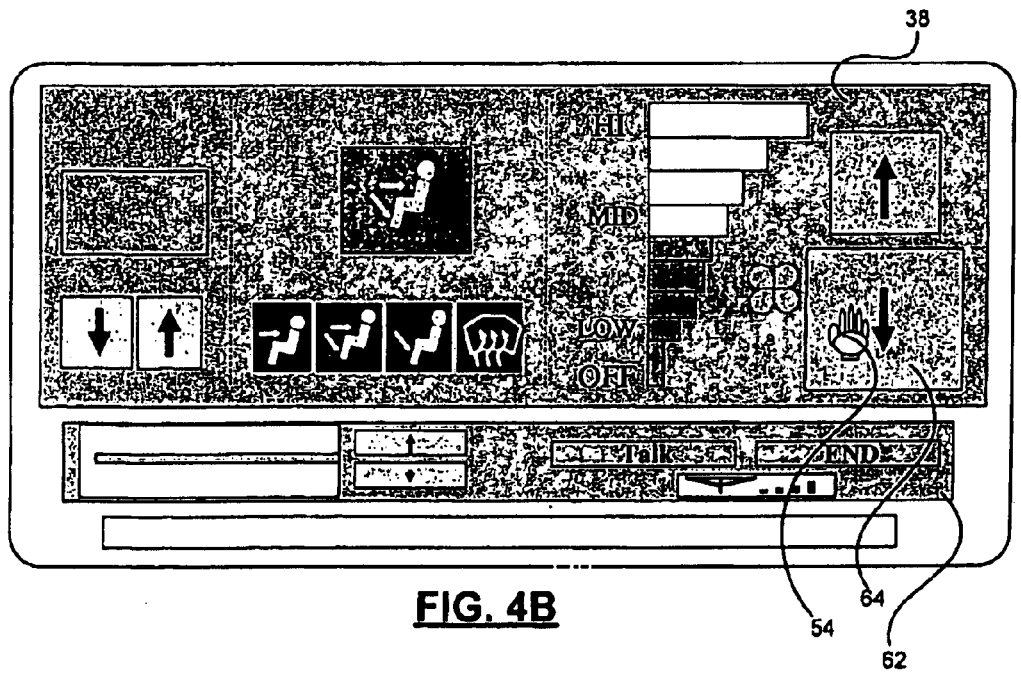
Figure 5A:
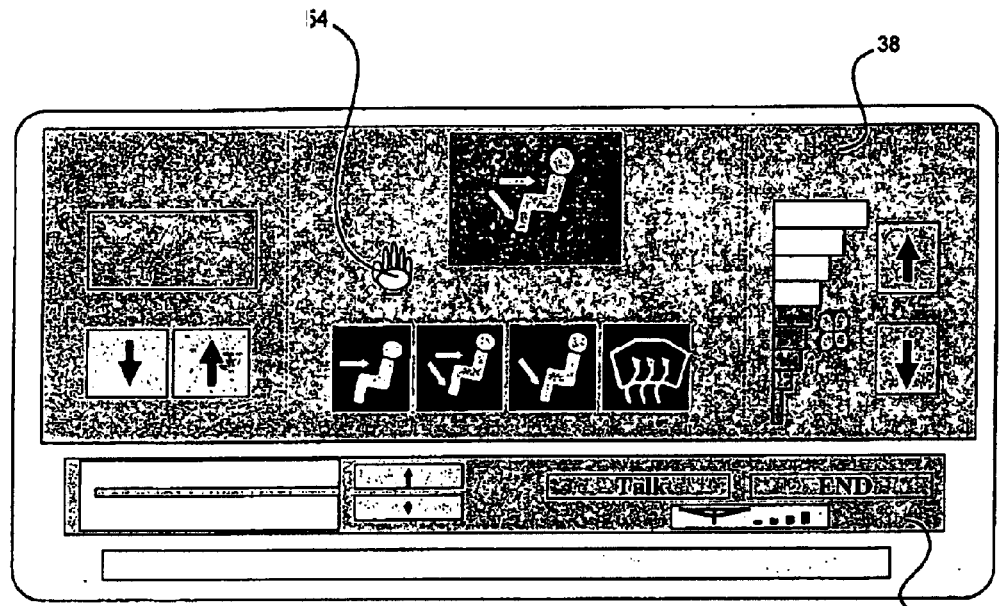
Figure 5B:
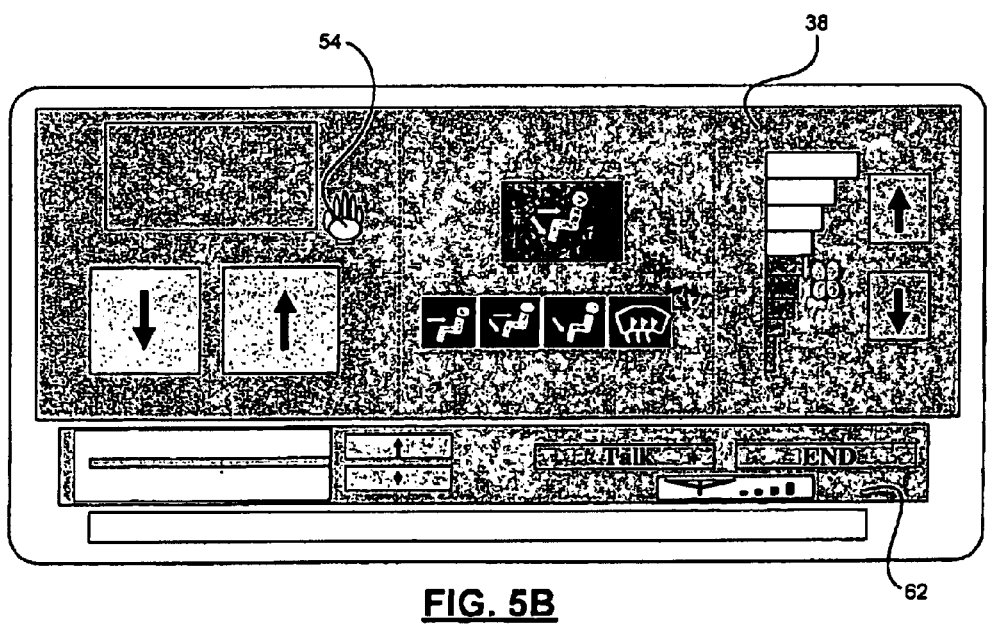

For example, as shown in FIGS. 4A, 4B, 5A, and 5B, the primary window 38 may provide the user with the selectable functions for HVAC devices. The user may select secondary window 62 to return to mobile telephone functions. As shown in FIG. 4B, a fan speed control button 64 is enlarged when the cursor 54 is positioned thereon. Similarly, the HVAC mode area of the primary window 38 is enlarged when the cursor 54 is positioned thereon, as shown in FIG. 5A. The behavior of the primary window 38 with respect to the cursor 54 and the touchpad 10 is consistent as the user navigates the display 34. In this manner, the user may easily interact with the selectable devices using the touchpad 10 and the display 34. It is to be understood that the relative positions and sizes of the secondary windows 60 and 62 in relation to the primary window 38 may vary. Additionally, other window configurations are anticipated.

Figure 6:
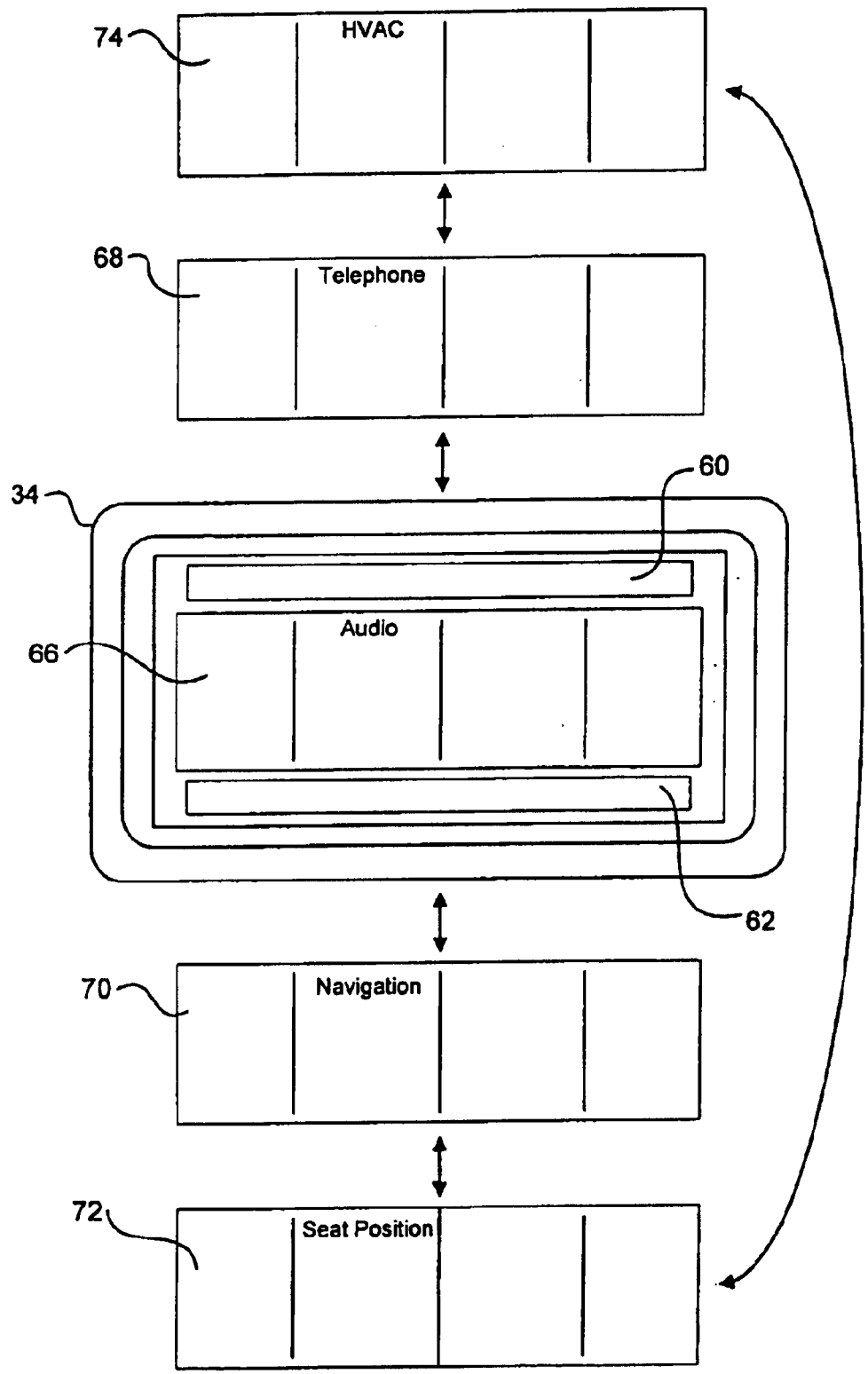
FIG. 6 illustrates a series of navigation windows for accessing various functions.

In the preferred embodiment, each of the controllable devices 22 may be represented in a window on the display 34, as shown in FIG. 6. For example, when audio functions 66 are displayed in the primary window 38, the user may quickly access telephone functions 68 or navigation functions 70, depending on whether the user selects secondary window 60 or 62. Selecting the secondary window 62 a second time will access seat position functions 72. It should be noted that the navigation of the display 34 is executed in a revolving manner. For example, the user may access HVAC functions 74 from either the telephone functions 68 or the seat position functions 72. In another embodiment, the controllable devices 22 are represented in windows on the display 34 in an arrangement analogous to the actual positions of the controllable devices 22 in the vehicle.

Heretofore, the interaction between the touchpad 10 and the cursor 54 has been discussed in relative position. For example, the position of the cursor 54 on the display 34 is adjusted relative to the motion of the finger 16 on the touchpad 10. Alternatively, the position of the cursor 54 on the display 34 may be adjusted according to an absolute position of the finger 16 on the touchpad 10, as is known in the art. For example, the exact position of the finger 16 on the touchpad 10 is directly translated to the position of the cursor 54 on the display 34.

Figure 7:
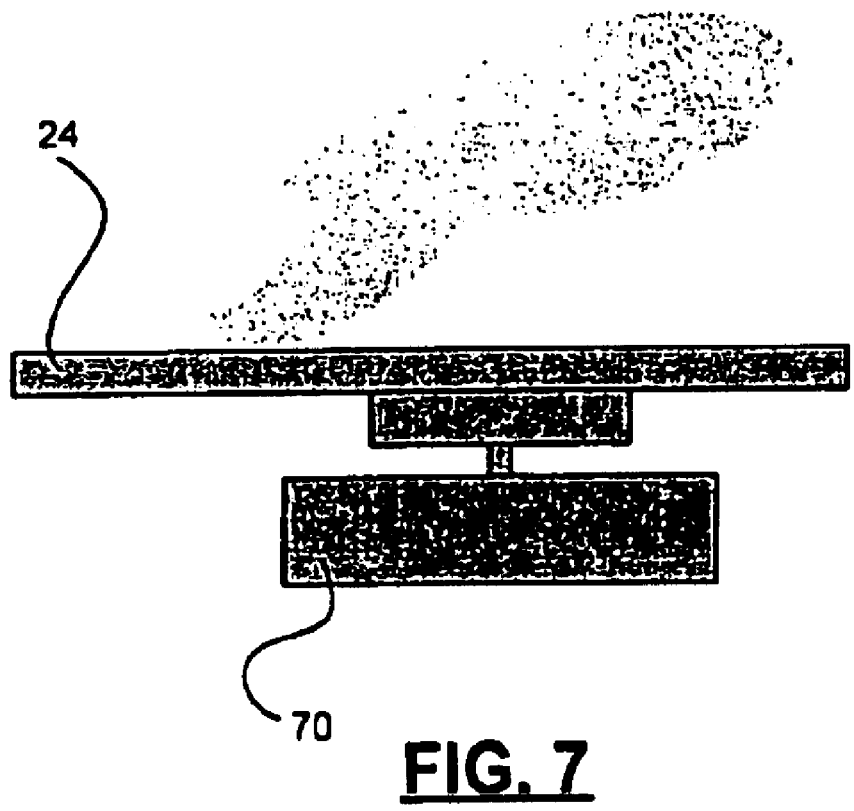
FIG. 7 illustrates a touchpad feedback device according to the present invention.

Referring now to FIGS. 1B and 7, a further embodiment of the present invention incorporates a feedback device 80. When activated, the feedback device 80 actuates, causing the user to experience a tangible vibration through the touchpad 10. The feedback device 80 provides the user with indicia relating to the user's interaction with the touchpad 10 and the display 34. For example, as the user slides a finger across the touchpad 10, the feedback device 80 may actuate at discrete intervals to indicate the position of the cursor 54. In particular, the feedback device 80 may actuate when the cursor 54 is moved to a different area of the display 34. For example, the feedback device 80 actuates when the cursor 54 is moved from the mode function 44 to the tuning function 42, as shown in FIG. 2A. Additionally, the feedback device 80 actuates when the cursor 54 is moved over a control button such as the tuning control button 56, as shown in FIG. 2B. The feedback device 80 may also actuate when the cursor is moved from the primary window 38 to the secondary window 60 or 62.

In this manner, the feedback device 80 enables the user to navigate the selectable devices on the display 34 while maintaining focus on driving the vehicle. It is therefore not necessary for the user to look at the display 34 while navigating and interacting with the selectable devices. In another embodiment, the feedback device 80 actuates when the user taps the touchpad 10 to select a function or device. The user can be confident that a function or device was properly selected without directing his or her attention away from the road. Other variations of the feedback device 80 are anticipated. Any suitable actuator that is operable to provide vibration or tapping to the touchpad 10 may be used.

Figure 8:
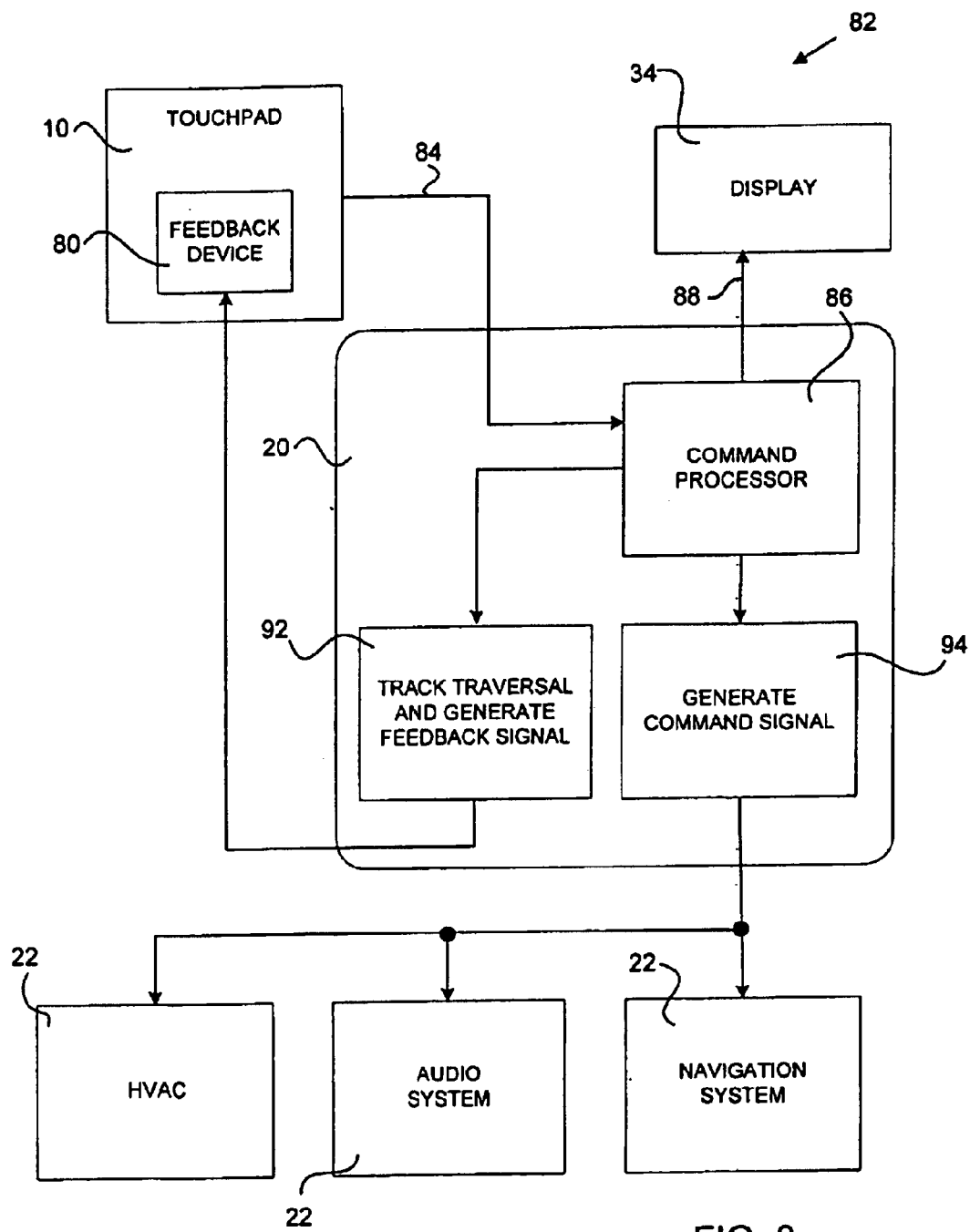
FIG. 8 is an exemplary system architecture according to the present invention.

Referring now to FIG. 8, an exemplary system architecture 82 according to the present invention is shown. The touchpad 10 generates an input signal 84 indicative of user interaction with the touchpad 10. A command processor 86 of the software module 20 processes the input signal 84. The command processor 86 generates an output, signal 88 according to the input signal 84 and communicates the output signal 88 to the display 34. The display 34 dynamically presents data such as cursor position and window arrangement according to the output signal 88.

Referring still to FIG. 8, the command processor 86 tracks the position of the user focus, or cursor 54, according to the input signal 84 and the output signal 88. More specifically, the command processor 86 tracks the position of the cursor 54 in relation to dynamic display regions 90 of the display 34. The dynamic display regions 90 correspond to the selectable functions and regions of the display 34 as shown in FIGS. 3A through 5B. The command processor 86 generates a feedback signal 92 according to the position of the cursor 54. In the preferred embodiment, the command processor 86 generates the feedback signal 92 as the cursor 54 traverses a boundary between the dynamic display regions 90. The feedback signal 92 is communicated to the feedback device 80. It is to be understood that the command processor 86 may generate the feedback signal 92 at other instances to indicate the position of the cursor 54 to the user.

Referring still to FIG. 8, the command processor 86 generates a command signal 94 according to the input signal 84. The command signal 94 is communicated to the controllable devices 22. In this manner, the command processor 86 issues commands to the controllable devices 22 according to inputs from the user.

It is to be understood that the touchpad 10 may be used in combination with other interface devices in the vehicle. For example, a second touchpad may be mounted on the steering wheel or another location, allowing the user to navigate different devices with each touchpad. Additionally, the user may select a particular device with the touchpad 10 and make adjustments thereto with a second touchpad or interface device, such as a dial or knob.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An integrated tactile visual interface for device control within a vehicle comprising:
   a touch pad that generates an input signal in response to input from a user;
   a display having at least one display region and a user focus;
   a software module that receives the input signal and communicates an output signal indicative of the input signal to the display, wherein the display adjusts the display region and the user focus according to the output signal, and the software module generates a feedback signal if the user focus traverses a boundary of the display region; and
   a feedback device integrated with the touch pad that receives the feedback signal and provides tangible feedback to the user through the touch pad in response to the feedback signal.

2. The interface of claim 1 wherein the software module generates a command signal indicative of the input signal.

3. The interface of claim 2 further comprising:
   at least one controllable device responsive to the command signal.

4. The interface of claim 1 wherein the touch pad is located on a steering wheel.

5. The interface of claim 1 wherein the user focus is a cursor.

6. The interface of claim 1 wherein the user focus is a highlighted display region.

7. The interface of claim 1 wherein the display region is dynamically presented according to the output signal.

8. The interface of claim 3 wherein the display region represents features of the controllable device.

9. The interface of claim 8 wherein the features include selectable functions of the controllable device.

10. The interface of claim 9 further comprising:
    a plurality of controllable devices; and
    a plurality of display regions representative of the controllable devices.

11. The interface of claim 9 wherein the selectable functions are display sub-regions.

12. The interface of claim 11 wherein the software module generates a feedback signal if the user focus traverses a boundary of the display sub-regions.

13. The interface of claim 11 wherein the display dynamically adjusts size, position, or arrangement of the display regions and sub-regions in response to the output signal.

14. The interface of claim 11 wherein the display includes a primary window.

15. The interface of claim 14 wherein the primary window corresponds to a selected controllable device.

16. The interface of claim 14 further comprising at least one secondary window, wherein the at least one secondary window corresponds to an unselected controllable device.

17. A method for device control within a vehicle comprising:
    generating an input signal at a touch pad in response to input from a user;
    displaying at least one display region and a user focus on a visual output device;
    receiving the input signal at a software module and communicating an output signal indicative of the input signal to the visual output device;
    adjusting the display region and the user focus according to the output signal;
    generating a feedback signal if the user focus traverses a boundary of the display region;
    receiving the feedback signal at a feedback device integrated with the touch pad; and
    providing tangible feedback to the user at the feedback device in response to the feedback signal.

18. The method of claim 17 further comprising:
    generating a command signal at the software module in response to the input signal; and
    receiving the command signal at a controllable device.

* * * * *